US009733730B2

(12) United States Patent
Tsai et al.

(10) Patent No.: US 9,733,730 B2
(45) Date of Patent: *Aug. 15, 2017

(54) SYSTEMS AND METHODS FOR NAVIGATING A SCENE USING DETERMINISTIC MOVEMENT OF AN ELECTRONIC DEVICE

(71) Applicant: Apple Inc., Cupertino, CA (US)

(72) Inventors: Richard H. Tsai, Cupertino, CA (US); Andrew B. Just, San Francisco, CA (US); Brandon B. Harris, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/543,017

(22) Filed: Nov. 17, 2014

(65) Prior Publication Data

US 2015/0070275 A1    Mar. 12, 2015

Related U.S. Application Data

(63) Continuation of application No. 12/361,331, filed on Jan. 28, 2009, now Pat. No. 8,890,898.

(51) Int. Cl.
*G09G 5/00* (2006.01)
*G06F 3/01* (2006.01)
*G06F 3/048* (2013.01)
*G06F 3/038* (2013.01)
*G06F 3/0346* (2013.01)

(52) U.S. Cl.
CPC ............ *G06F 3/0346* (2013.01); *G06F 3/017* (2013.01); *G06F 3/038* (2013.01); *G06F 3/048* (2013.01)

(58) Field of Classification Search
None
See application file for complete search history.

(56) References Cited

U.S. PATENT DOCUMENTS 6,222,583 B1    4/2001  Matsumura et al.
6,466,198 B1   10/2002  Feinstein
(Continued)

OTHER PUBLICATIONS

Bouguet. "Pyramidal Implementation of the Lucas Kanade Feature Tracker Description of the Algorithm." OpenCV Technical Document, 2000, pp. 1-9.
Burigat et al. "Location-aware Visualization of VRML Models in GPS-based Mobile Guides." Proceedings of the Tenth International Conference on 3D Web Technology, 2005, pp. 57-64 & 188.
(Continued)

*Primary Examiner* — M Good Johnson
(74) *Attorney, Agent, or Firm* — Van Court & Aldridge LLP

(57) ABSTRACT

Systems and methods are providing for scrolling the display of information based on the displacement of the electronic device. An electronic device can include a motion sensing component operative to detect movement of the electronic device (e.g., an accelerometer). The electronic device can display any suitable information, including information that is too large to display at a single instance on the display (e.g., a multi-page text document, or a large image). To view portions of the information that are not initially displayed (e.g., to scroll displayed information), the user can move the electronic device along the plane of the device. As the motion sensing component detects movement, the electronic device can scroll the displayed information to match the detected movement. In some embodiments, the electronic device can detect tilt movements and adjust the displayed information to reflect the tilted display.

20 Claims, 9 Drawing Sheets

(56) References Cited

U.S. PATENT DOCUMENTS

| | | |
|---|---|---|
| 7,038,662 B2 | 5/2006 | Noguera |
| 7,138,979 B2 | 11/2006 | Robin et al. |
| 7,176,887 B2 | 2/2007 | Marvit et al. |
| 7,180,500 B2 | 2/2007 | Marvit et al. |
| 7,180,502 B2 | 2/2007 | Marvit et al. |
| 7,271,795 B2 | 9/2007 | Bradski |
| 7,280,096 B2 | 10/2007 | Marvit et al. |
| 7,958,135 B2 | 6/2011 | Katoh et al. |
| 8,005,831 B2 | 8/2011 | Hull et al. |
| 2001/0048423 A1 | 12/2001 | Rekimoto |
| 2006/0017692 A1 | 1/2006 | Wehrenberg et al. |
| 2006/0089797 A1 | 4/2006 | Suzuki et al. |
| 2006/0164382 A1 | 7/2006 | Kulas et al. |
| 2006/0210045 A1 | 9/2006 | Valliath et al. |
| 2007/0067104 A1 | 3/2007 | Mays |
| 2007/0268392 A1 | 11/2007 | Paalasmaa et al. |
| 2008/0033641 A1 | 2/2008 | Medalia |
| 2008/0062167 A1 | 3/2008 | Boggs et al. |
| 2008/0102785 A1 | 5/2008 | Childress et al. |
| 2008/0231684 A1 | 9/2008 | Underwood et al. |
| 2008/0273109 A1 | 11/2008 | Bamford |
| 2009/0066637 A1 | 3/2009 | Mc Call |
| 2009/0088204 A1 | 4/2009 | Culbert et al. |
| 2009/0315915 A1 | 12/2009 | Dunn et al. |
| 2010/0097494 A1 | 4/2010 | Gum et al. |
| 2010/0125409 A1 | 5/2010 | Prehofer |
| 2010/0191459 A1 | 7/2010 | Carter et al. |
| 2011/0109618 A1 | 5/2011 | Nowak et al. |
| 2011/0113383 A1 | 5/2011 | Dyack et al. |

OTHER PUBLICATIONS

Clipp et al. "A Mobile 3D City Reconstructions System." Proc. IEEE VR Workshop on Cityscapes, Dec. 31, 2008, 4 pages.

Hwang et al. "Hand-Held Virtual Reality: A Feasibility Study." Proceedings of the ACM Symposium on Virtual Reality Software and Technology (VRST '06), Nov. 1-3, 2006, pp. 356-362.

Hwang et al. "Camera Based Relative Motion Tracking for Hand-Held Virtual Reality." Proceedings of NICOGRAPH International 2006, Jun. 2006, 6 pages.

Labrie et al. "Efficient Camera Motion and 3D Recovery Using an Intertial Sensor." Fourth Canadian Conference on Computer and Robot Vision, May 1, 2007, pp. 55-62.

Nurminen et al. 10 Designing Interactions for Navigation in 3D Mobile Maps. Map-based Mobile Services: Design, Interaction and Usability, Meng et al. (Eds.), pp. 198-227, Aug. 6, 2008.

Pollefeys et al. "From Images to 3D Models, How Computers Can Automatically Build Realistic 3D Models from 2D Images Acquired With a Handheld Camera." Communications of the ACM, Jul. 2002, vol. 45, No. 7, pp. 51-55.

Redell, "Thinking About Accelerometers and Gravity" (4 pages) http://www.lunar.org/docs/LUNARclips/v5/v5n1/Accelerometers.html. Archived on Jan. 25, 2007. Retrieved on Sep. 17, 2013 from http://web.archive.org/web/20070124185521/http://www.lunar.org/docs/LUNARclips/v5/v5n1/Accelerometers.html.

"Nokia Maps: User Guide Version 1.0" retrieved from http://nds1.nokia.com/files/supportlglobal/phones/guides/Maps_1_UG_en_4.pdf, Oct. 15, 2008, 28 pages.

"Tom Tom PalmOS" retrieved from http://www.pdabuzz.com/Home/tabid/54/articleType/ArticleView/articleId/619/ReviewTomTomGPSSoftwareandPalmOneGPSModule.aspx, Oct. 16, 2006, 5 pages.

SYSTEMS AND METHODS FOR NAVIGATING A SCENE USING DETERMINISTIC MOVEMENT OF AN ELECTRONIC DEVICE

CROSS-REFERENCE TO RELATED APPLICATIONS

This application is a continuation of U.S. patent application Ser. No. 12/361,331 filed Jan. 28, 2009, the entirety of which is incorporated herein by reference.

BACKGROUND OF THE INVENTION

This is directed to systems and methods for navigating a scene, document, or other displayed objects using deterministic movement of an electronic device. In particular, this is directed to systems and methods for changing the display of objects on a device based on measured movements of an electronic device.

Users of electronic devices can view different types of information on displays associated with the devices. One significant advantage of using an electronic device for storing and displaying information can be that the amount of information stored and displayed can exceed the physical size of the device display. For example, the electronic device can store and display large documents having more pages than can be simultaneously displayed on the device. As another example, the electronic device can display objects or information retrieved from a remote database, such as the Internet. As still another example, the electronic device can display images associated with a virtual or real world (e.g., views of a street or environment).

To access information using the electronic device, a user can provide an input using an input mechanism (e.g., a button, touch-screen, switch, or other suitable mechanism) to select particular information for display. For example, a user can select a file to open, activate an application window (e.g., an application for accessing information from a remote source, such a web browser for accessing information from the Internet), or select an icon or other selectable object for accessing information. In some embodiments, the amount of information selected for display may exceed the amount that can be simultaneously displayed by the electronic device display. To view all of the available information, the user can either direct the electronic device to zoom out the display (e.g., such that the displayed information is small), or provide an input directing the device to change the displayed information (e.g., paging up or down, or scrolling displayed information). In some cases, however, a user may not be able to provide an input to an input mechanism (e.g., the user's hands are busy). Another mechanism may then be necessary to allow a user to view information that is not initially displayed without requiring the user to provide an input to a particular input mechanism.

SUMMARY OF THE INVENTION

This is directed to systems and methods for viewing information or objects that exceed the boundaries or periphery of an electronic device display based on deterministic movement of the electronic device.

In some embodiments, an electronic device can display information that exceeds the periphery of the device display. For example, a user of an electronic device can display a text document that includes several pages, or an image that is larger than the device display (e.g., when zoomed). To view portions of the information that are not initially displayed, a user can provide an input using an input mechanism (e.g., a button or a touch screen) to direct the device to scroll the displayed information. In some cases, however, the user may not have access to the input mechanism. For example, a user's hands can be otherwise occupied. As another example, the user may have limited movement with his hands (e.g., the user is holding another object) preventing the user from accessing the input mechanism.

To allow the device to scroll displayed information without an input mechanism input, the electronic device can include a motion sensing component (e.g., an accelerometer) operative to detect movements of the electronic device. When the user enables a movement based scrolling mode (e.g., using one or more of an input and a predetermined device movement), the electronic device can monitor the motion sensing component for device movement and scroll the displayed information based on the output of the motion sensing component. The information displayed can be correlated to the device movement using any suitable approach, including for example such that a particular physical position of the device corresponds to displaying a determined portion of the information (e.g., returning the device to the initial position when the mode is enabled will cause the device to display the initial portion of the information).

In some embodiments, the electronic device can receive or predict movement information of the electronic device environment. For example, the device can determine where the user and device are moving, and predict or receive the motion sensing data associated with the movement. The device can then remove the environmental movement component of the detected motion from the motion sensing component output to isolate the device movement caused by the user.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
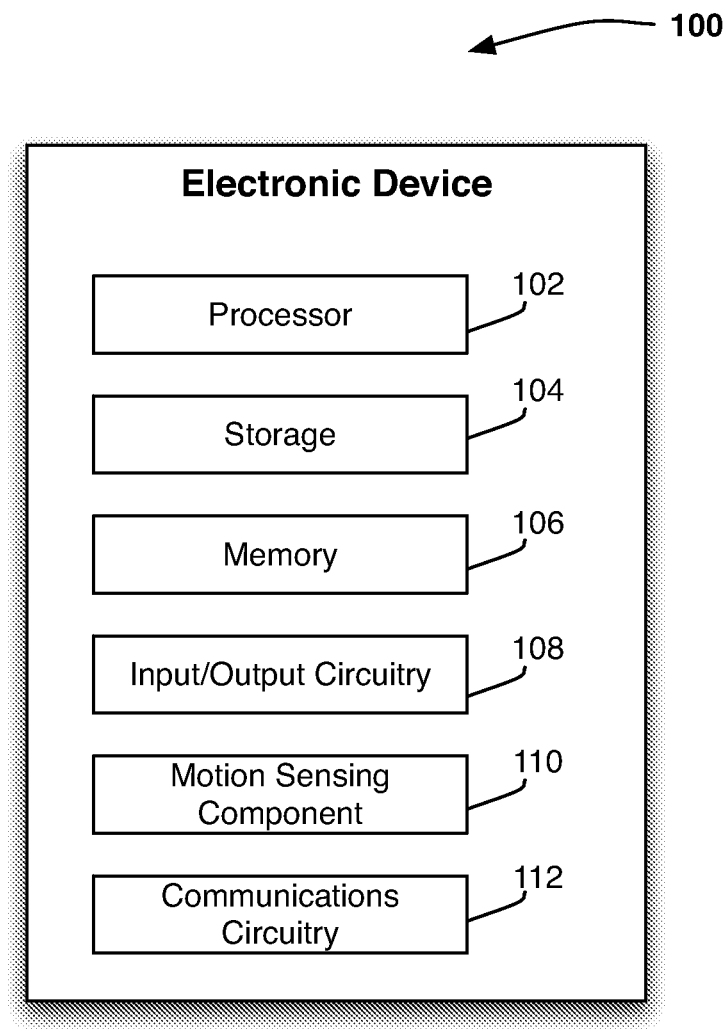
FIG. 1 is a schematic view of an illustrative electronic device for changing the display of information based on device movement in accordance with one embodiment of the invention.

This is directed to systems and methods for navigating information displayed on an electronic device display based on movements of the electronic device.

An electronic device can be operative to provide information for display to a user. For example, the electronic device can include an embedded display operative to display information requested by the user. In some embodiment, the particular information displayed, or the amount of information available for display can exceed the periphery of the display. For example, a user can direct the electronic device to display a document (e.g., a text document) that does not fit within the boundaries of the display. As another example, the user can direct the electronic device to access and display information from a remote database, such as mapping information, or a series of images forming a panoramic view of a location.

To display information not initially provided on the display, the user can provide an input using an input mechanism to direct the electronic device to scroll or page the display, thus replacing the displayed information with new information. For example, the user can select on-screen directional keys (e.g., displayed arrows or a scroll bar), or provide an instruction to scroll the display using an input mechanism coupled to the device (e.g., directional keys or buttons from a keyboard or keypad), or any other suitable input mechanism. In some cases, however, a user may not be able to access an input mechanism to change the information displayed by a device. For example, a user may be holding the device in a manner that prevents the user from moving fingers over an input mechanism. As another example, the user may be performing an action in addition to manipulating the electronic device that limits the availability of the user's hands for providing an input.

It may nevertheless be desirable to allow a user to navigate displayed information without actuating an input mechanism. In some embodiments, the user may do so based on the output of one or more motion sensing or motion detection components embedded in the electronic device. The electronic device can include any suitable component operative to monitor and quantify movements of the device. For example, the electronic device can include one or more accelerometers, gyroscopes, or any other component operative to detect motion. Based on the motion sensing component output, the electronic device can determine the amount and direction by which to scroll the device. The electronic device can use some or all of the determined motion, including for example only motion information associated with the plane of the display (e.g., ignore the portions of the motion in a direction perpendicular to the plane of the display).

The electronic device can determine the relation between the amount and direction by which the device was moved and the amount and direction by which to scroll the displayed information using any suitable approach. In some embodiments, the electronic device can define a vector associated with device movement, and scroll the display in a manner proportionally related to the vector (e.g., scroll the display by a factor of x times the vector). To ease the burden of following the scrolled display, the electronic device can apply a hysteresis to the display transition.

The user can enable a mode in which device movement is associated with scrolling displayed information using any suitable approach, including for example one or more of an input mechanism input and a particular motion of the device (e.g., touch a touch screen or touch pad and shake the device). To temporarily disengage the movement based scrolling mode, for example as the user changes position or moves, the user can provide a particular input using the input mechanism (e.g., hold a touch screen or touch pad to lock the displayed information until the touch screen or touch pad is released).

In some embodiments, the electronic device can enable the movement based scrolling mode in accelerating environments by removing the accelerating component of the environment from the motion detected by the device. For example, the electronic device can determine the expected displacement of the user's environment (e.g., a car or other public transportation used by the user), identify expected accelerations or past accelerations associated with the expected displacement, and extract the identified accelerations from the measured movement data of the electronic device. The electronic device can identify information associated with expected displacements using any suitable approach, including for example past or historic displacements (e.g., a user's regular commute), a scheduled trip (e.g., a route planned using a mapping application), GPS or movement information retrieved from the accelerating environment (e.g., information from a GPS unit in an automobile), or any other suitable approach.

To further enhance the user's experience, portions of the detected motion in a direction perpendicular to the plane of the display can be used to modify or distort the displayed information relative to the user's eyes. For example, the electronic device can stretch displayed text when the device is tilted so that the user will have the impression of viewing a static, physical document through a reduced size window (e.g. reduced relative the size of the display when it is in the same plane as the physical document).

FIG. 1 is a schematic view of an illustrative electronic device for changing the display of information based on device movement in accordance with one embodiment of the invention. Electronic device 100 can include any suitable type of electronic device operative to display information to a user while detecting movement of the device. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a camera, radios, medical equipment, and any other portable electronic device capable of being moved by the user.

Electronic device 100 can include a processor or control circuitry 102, storage 104, memory 106 input/output circuitry 108, and communications circuitry 112, as typically found in an electronic device of the type of electronic device 100. In some embodiments, one or more of electronic device components 100 can be combined or omitted (e.g., combine storage 104 and memory 106), or electronic device 100 can include other components not combined or included in those shown in FIG. 1 (e.g., positioning circuitry), or several instances of the components shown in FIG. 1. For the sake of simplicity, only one of each of the components is shown in FIG. 1.

Motion sensing component 110 can be operative to detect movements of electronic device 100. In some embodiments, a motion sensing component can include one or more three-axes acceleration motion sensing components (e.g., an accelerometer) operative to detect linear acceleration in three directions (i.e., the x or left/right direction, the y or up/down direction, and the z or forward/backward direction). As another example, a motion sensing component can include one or more two-axis acceleration motion sensing components which can be operative to detect linear acceleration only along each of x or left/right and y or up/down directions (or any other pair of directions). In some embodiments, a motion sensing component can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, the motion sensing component can directly detect rotation, rotational movement, angular displacement, tilt, position, orientation, motion along a non-linear (e.g., arcuate) path, or any other non-linear motions. For example, if the motion sensing component is a linear motion sensing component, additional processing can be used to indirectly detect some or all of the non-linear motions. For example, by comparing the linear output of the motion sensing component with a gravity vector (i.e., a static acceleration), the motion sensing component can calculate the tilt of electronic device 100 with respect to the y-axis. In some embodiments, the motion sensing component can instead or in addition include one or more gyro-motion sensing components or gyroscopes for detecting rotational movement. For example, motion sensing component 110 can include a rotating or vibrating element. As another example, motion sensing component 110 can include a magnometer operative to detect the orientation of the device relative a magnetic north pole. The electronic device can monitor changes in the output of the magnometer to detect rotations of the device.

In some embodiments, electronic device 100 can include positioning circuitry for determining the current position of electronic device 100, and can be operative to update the current position at any suitable rate, including at relatively high rates to provide an estimation of speed and distance traveled. In some embodiments, the positioning circuitry can include a global positioning system ("GPS") receiver for accessing a GPS application function call that returns the geographic coordinates (i.e., the geographic location) of the device. The geographic coordinates can be fundamentally, alternatively, or additionally derived from any suitable trilateration or triangulation technique. For example, the device can determine its location using various measurements (e.g., signal-to-noise ratio ("SNR") or signal strength) of a network signal (e.g., a cellular telephone network signal) associated with the device. For example, a radio frequency ("RF") triangulation detector or sensor integrated with or connected to the electronic device can determine the approximate location of the device. The device's approximate location can be determined based on various measurements of the device's own network signal, such as: (1) the angle of the signal's approach to or from one or more cellular towers, (2) the amount of time for the signal to reach one or more cellular towers or the user's device, (3) the strength of the signal when it reaches one or more towers or the user's device, or any combination of the aforementioned measurements, for example. Other forms of wireless-assisted GPS (sometimes referred to herein as enhanced GPS or A-GPS) can also be used to determine the current position of electronic device 100. Instead or in addition, the positioning circuitry of the device can the location of the device based on a wireless network or access point that is in range or a wireless network or access point to which the device is currently connected. For example, because wireless networks have a finite range, a network that is in range of the device can indicate that the device is located in the approximate geographic location of the wireless network. In some embodiments, the device can automatically connect to a wireless network that is in range in order to receive the valid modes of operation for that location.

A user of the electronic device can direct the device to display any suitable information. For example, the device can display a file that includes text (e.g., as paragraphs, in a table, as part of a presentation, or in any other format). As another example, the device can display one or more images (e.g., from an album of images, or a collection of images showing the appearance of a scenery in a world). The amount of information displayed at any given time can be limited by one or more of the dimensions of the electronic device display, and the size or zoom of the information requested by the user. In particular, the more a user wishes to zoom in on information (e.g., use a larger font for displayed words), the less of the entire information can be displayed at a particular moment in time.

Figure 2:
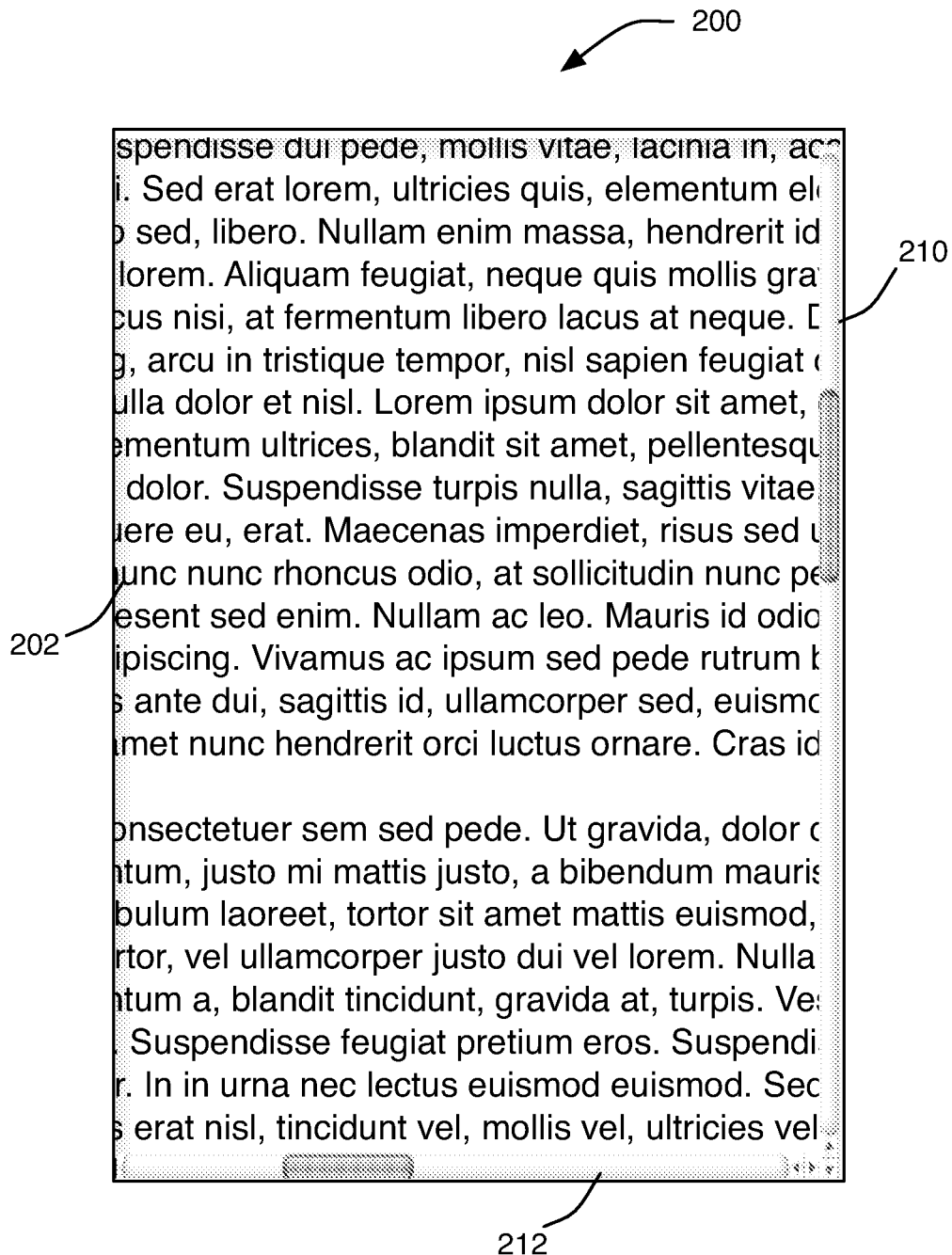
FIG. 2 is a schematic view of an illustrative display of text in accordance with one embodiment of the invention.

FIG. 2 is a schematic view of an illustrative display of text in accordance with one embodiment of the invention. Display 200 can include text 202, which can be organized in any suitable manner. For example, text 202 can be organized in one or more paragraphs, tables, as part of a presentation, in a manner defined by a particular application, or any other suitable manner. The displayed text can be part of a larger document, for example text from one page or part of one page of a multiple page document. The device can indicate that additional text is available using any suitable manner, including for example scroll bars 210 and 212, or any other displayed indication of additional text (e.g., on-screen arrows or icons to scroll up and down). To view the additional text, the user can direct the device to scroll by providing a scrolling input using an input mechanism (e.g., direct a cursor to move using directional keys) or select one of the displayed options for scrolling the display. In response to receiving an appropriate instruction, the electronic device can scroll the displayed text.

Figure 3:
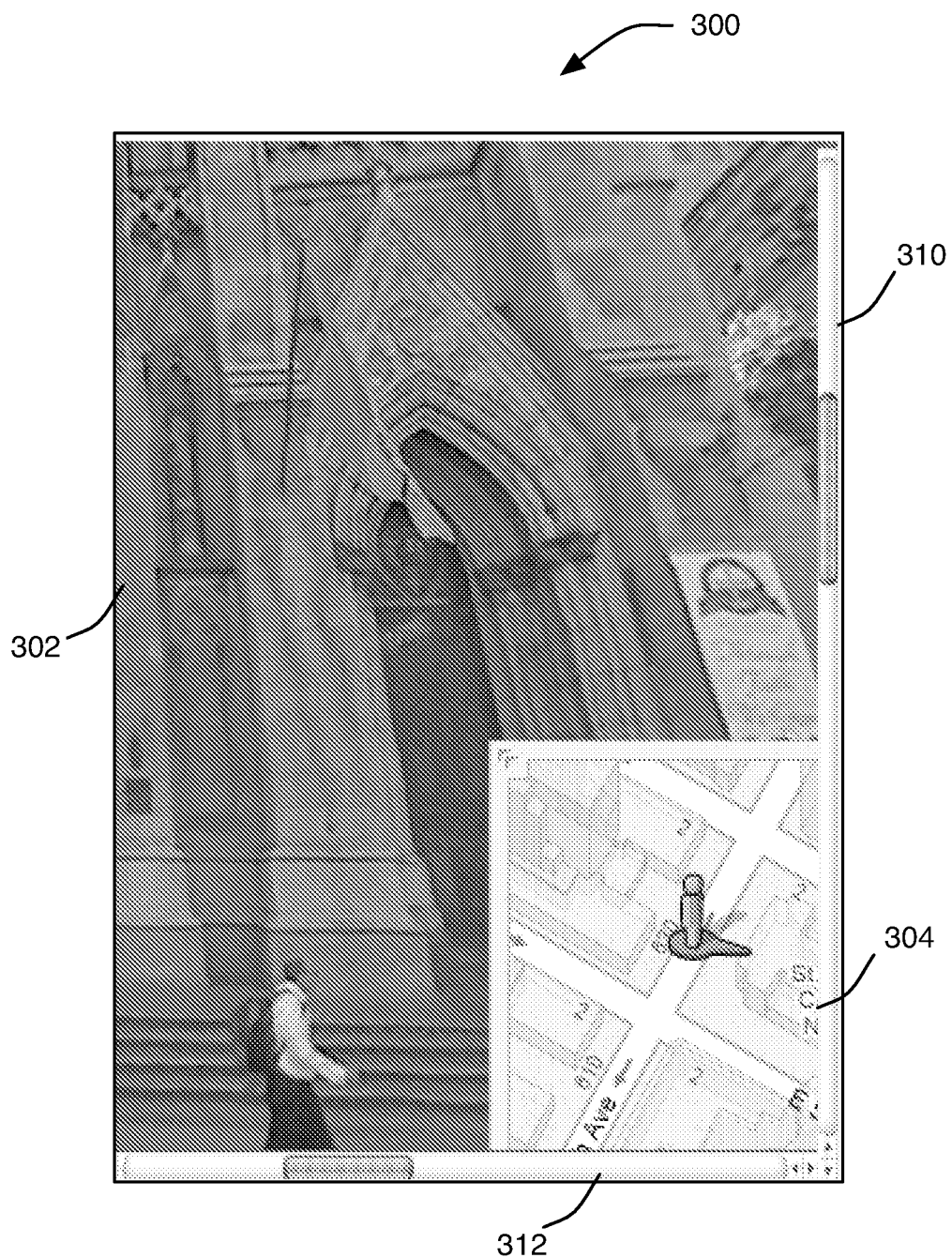
FIG. 3 is a schematic view of an illustrative display of an image in accordance with one embodiment of the invention.

FIG. 3 is a schematic view of an illustrative display of an image in accordance with one embodiment of the invention. Display 300 can include image 302 of any suitable object or world. For example, image 302 can include an image from a street view of a real-world location. As another example, image 302 can depict a location in a virtual world (e.g., a game world, or an alternate world populated by virtual characters). In some embodiments, display 300 can include overlay 304 providing context for image 302 (e.g., a map), or any other suitable overlay. Display 300 can include any suitable overlay to indicate to the user that additional information is available for display. For example, display 300 can include scroll bars 310 and 312, or any other displayed indication of additional portions of an image (e.g., on-screen arrows or icons to scroll up and down). To view the additional portions of the image, the user can direct the device to scroll by providing a scrolling input using an input mechanism (e.g., direct a cursor to move using directional keys) or select one of the displayed options for scrolling the display. In response to receiving an appropriate instruction, the electronic device can scroll the displayed information.

Although FIGS. 2 and 3 show displays of text and images, respectively, it will be understood that information displayed by an electronic device can include combinations of text and images, as well as selectable options, menus, pop-up windows, icons, docks, or any other content that can be displayed by the device. In particular, each of displays 200 and 300 can include, instead of or in addition to the information displayed, one or more selectable options for navigating the displayed information (e.g., closing a displayed window or document), performing electronic device operations (e.g., launching an application), or any other action for controlling the electronic device.

In some embodiments, a user may not be able to actuate an input mechanism to direct the display to scroll the displayed information. For example, the user's hands may be occupied and unable to press one or more buttons, or navigate a cursor or selection mechanism to a displayed option. To allow a user to nevertheless view different information without providing an input using an input mechanism, the electronic device can associate deterministic movements of the device with instructions to display additional information. In particular, the electronic device can scroll the display of information in a manner related to the movement of the device in the plane of the display.

Figure 4:
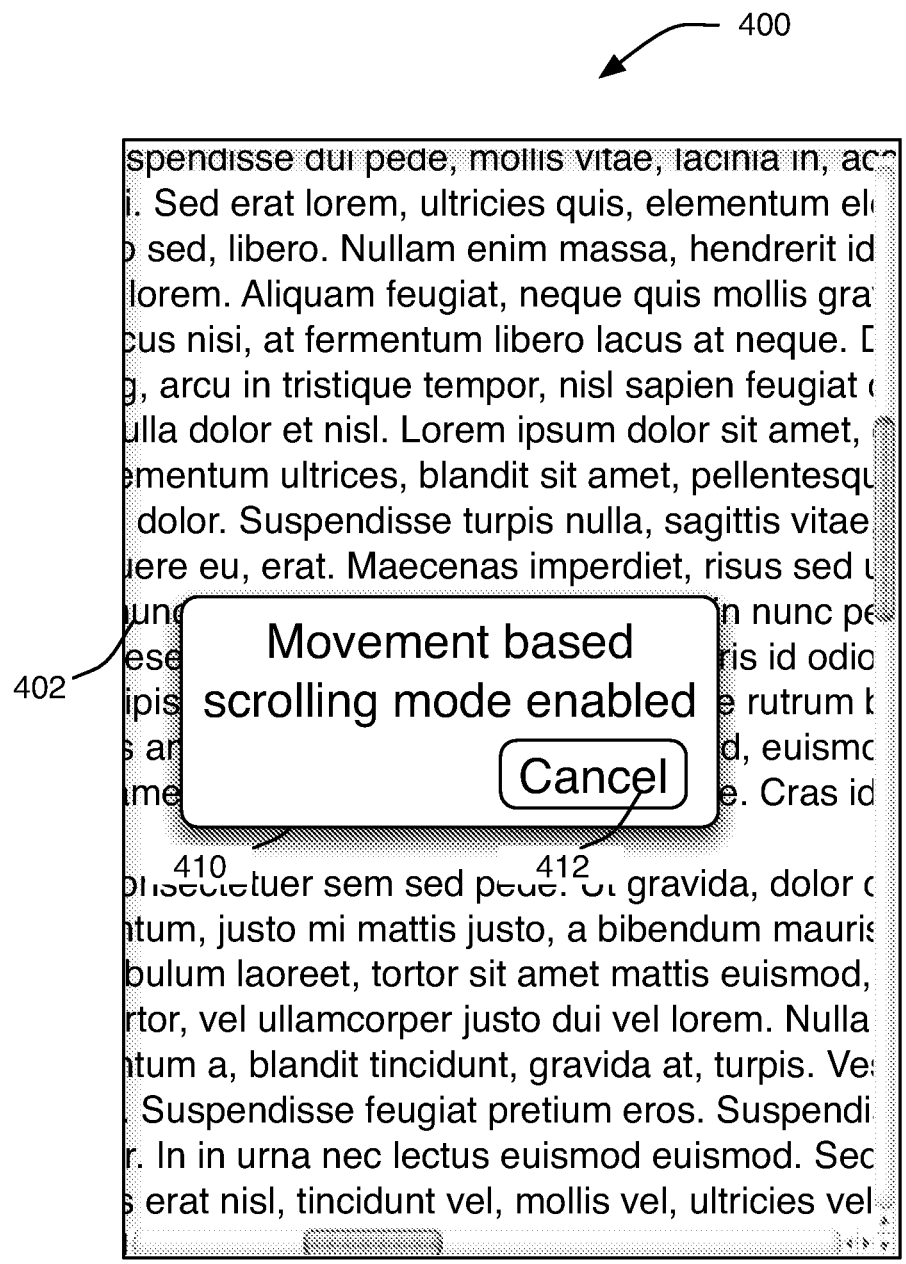
FIG. 4 is a schematic view of an illustrative display having an indication that a movement based scrolling mode has been enabled.

The user can enable deterministic movement based scrolling using any suitable approach. In some embodiments, the user can enable movement based scrolling by providing a particular input using an input mechanism. For example, a user can press one or more buttons or keys associated with enabling movement based scrolling using an input mechanism. As another example, a user can move an electronic device in a particular manner (e.g., shake and twist a device in a particular manner) to enable movement based scrolling. As still another example, a combination of an input using an input mechanism and deterministic movement of the device can be used (e.g., shake the device while placing a finger on a touch screen). The electronic device can indicate to a user that the movement based scrolling mode has been enabled using any suitable approach, including for example using one or more of an audio indication and a visual indication. FIG. 4 is a schematic view of an illustrative display having an indication that a movement based scrolling mode has been enabled. Display 400 can include information 402 extending beyond the periphery of the electronic device display, and pop-up 410 indicating that the movement based scrolling mode has been enabled. If the user inadvertently provided an input associated with enabling the mode, the user can select displayed cancel option 412 to disable the movement based scrolling mode.

Once the movement based scrolling mode is enabled, the electronic device can correlate device movements with the scrolling of displayed information. In particular, the electronic device can perform any suitable processing on the data provided by the motion sensing components of the electronic device. For example, the electronic device can process a motion sensing component output to generate at least one vector indicating a direction and magnitude of the electronic device motion. As another example, the electronic device can integrate acceleration information received from the motion sensing component to define velocity information, displacement information (e.g., the distance and orientation of the electronic device movement), or both. In some embodiments, the electronic device processing can extract device motion along particular axes or in particular planes. For example, the electronic device can process motion sensing component outputs to extract data reflecting motion of the electronic device in the plane of the display. As another example, the electronic device can identify and quantify tilting motion of the device (e.g., motion that causes the plane of the display to change).

Figure 5:
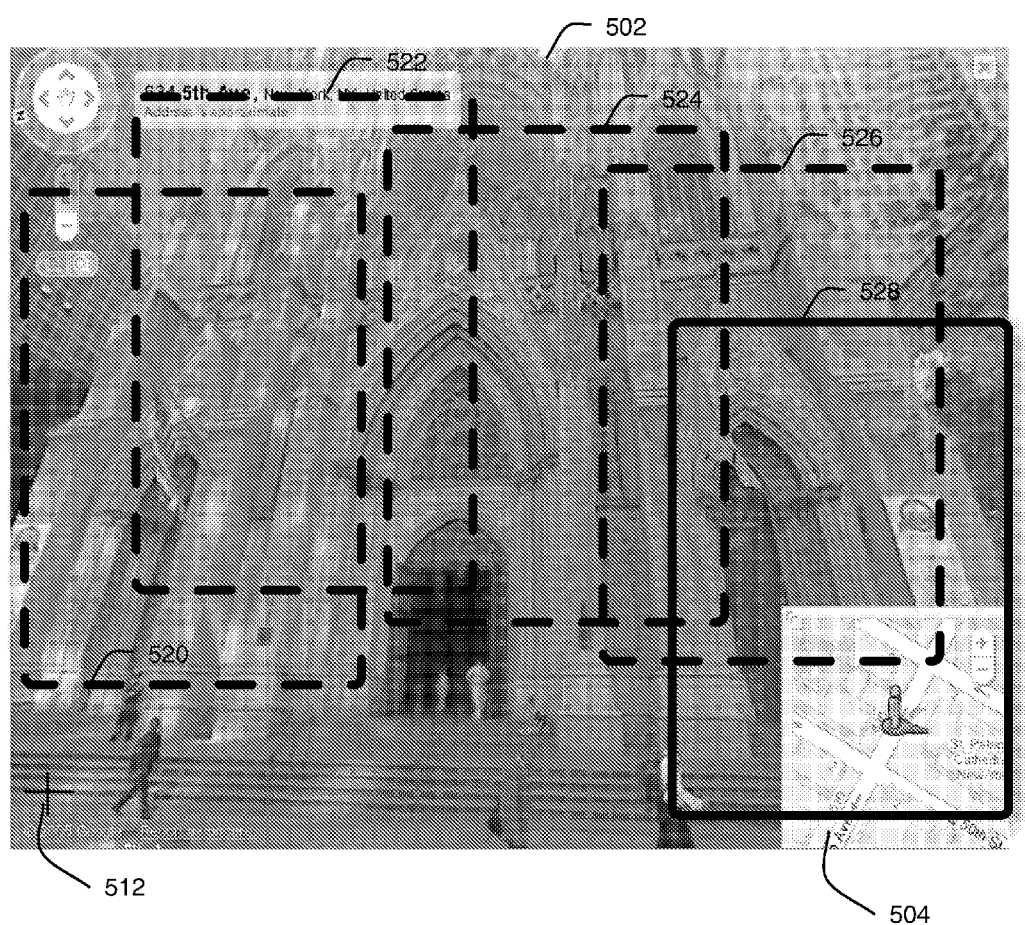
FIG. 5 is a schematic view of an illustrative display as the device moves in accordance with one embodiment of the invention.

Using the processed and quantified electronic device movement information, the electronic device can determine the correlation between the quantified device movement information and the amount by which to scroll displayed information. In some embodiments, the correlation can be related to the relative size of the displayed information. FIG. 5 is a schematic view of an illustrative display as the device moves in accordance with one embodiment of the invention. In the example of FIG. 5, a user can be viewing image 502, which can be larger than the size of the device display (e.g., display 510). This therefore limits the amount of image 502 that the user can view at any given time. To view portions of image 502 that are not displayed, the user can move the electronic device such that display 510 changes from position 520 to positions 522, 524, 526 and finally position 528 (e.g., the device moves in the plane of display 510 from position 520 to position 528 relative to origin 512). As display 510 moves, the portions of image 502 displayed can change to give the effect that display 510 is a mobile window over image 502 that the user can move to see different portions of the image.

The electronic device can correlate the device movement and the information displacement using any suitable approach. For example, the correlation can be related to the zoom or amount of the total information available for display by the device at any particular time (e.g., 1 cm of device displacement corresponds to the displacement by the on-screen equivalent of 1 cm, thus accounting for zoom). As another example, the correlation can be related to the amount of total information available for display on the document (e.g., 1 cm displacement corresponds to a displacement of $\frac{1}{100}$ of the available information so that the user can scroll from one end of the information to the other end by moving the device by 1 m). As still another example, combinations of these approaches can be used (e.g., apply a correlation related to zoom until the size of the zoomed information exceeds a particular limit). To assist the user in navigating the displayed information, the correlation can be defined such that when the user returns the electronic device to a particular spatial position relative an origin (e.g., relative the position of the device when the movement based scrolling mode is enabled), the same information is always displayed. In some embodiments, the electronic device can therefore ignore movements of the device once the device reaches an edge of the displayed information, but resume changing the displayed information only once the device returns to a position relative the origin that reflects the edge of the displayed information. Such an approach can enhance the user's ability to use movement based scrolling by providing a known physical correlation to the user's movement. Alternatively, the device can resume changing the display of information as soon as movement away from the detected edge is identified.

In some embodiments, the correlation between device movement and information scrolling can include a non-linear portion. For example, the amount of displacement initially as the device first starts to move can be small and ramp up, and the amount of displacement as the device stops moving can decrease rapidly before slowing down. The non-linear displacement at one or both of the beginning and end of the device displacement can allow the user's eyes to anticipate and better follow the displacement of the information as it occurs. The particular mathematical definition of the non-linear displacement can include any suitable non-linear formulation, including for example one associated with a hysteresis. In some embodiments, heuristics can be used to define the exact displacements to associate with each of the beginning and end of the device movement (e.g., based on the amount of movement, initial or final acceleration associated with the movement, boundaries of information available, or whether the displacement is associated with the beginning or end of the movement).

The movement based scrolling mode can be of particular interest in accelerating environments. For example, a user can enable a movement based scrolling mode as a user reads a document on an airplane or in a car or train, or in any other suitable mode of transportation. When the user's transportation unexpectedly moves (e.g., turbulence or bumps in the road) along the plane of the device, the displayed portion of the document can change to follow the displacement of the user relative to the device display, thus ensuring that the actual information displayed matches the information expected by the user's eyes. In other words, the window into the information (e.g., shown by the consecutive display positions in FIG. 5) can move with the accelerating environment, while the information being displayed can remain immobile relative to the user (e.g., as if the user was viewing static information).

In some embodiments, however, the accelerating environment can provide an acceleration signal detected by the device which can cause the information displayed to change despite the user not moving the device (e.g., the acceleration of the environment was interpreted as an acceleration requested by the user). To eliminate the portion of detected acceleration due to the user's environment, the device may require information describing the acceleration of the environment. Such information can be provided using any suitable approach. In some embodiments, a component of the user's environment can include motion detection circuitry indicative only of the environment acceleration. For example, an automobile can include one or more accelerometers for detecting the acceleration of the automobile. As another example, an aircraft can include one or more gyroscopes used for navigation and displaying aircraft characteristics to a pilot. The motion detection component of the environment can then broadcast or transmit directly to the device (e.g., upon request from the device, automatically generated in response to entering the movement based scrolling mode) detected environment acceleration information (e.g., in real time). In response to receiving the environment acceleration information, the electronic device can process detected acceleration to extract the received acceleration information (e.g., perform a subtraction operation as part of the processing) and isolate the acceleration information associated with the user's movement of the device. The user's environment can use any suitable wired or wireless communications protocol to provide the environment acceleration information to the device, including for example Bluetooth or Wi-Fi.

In some embodiments, the user's environment may not include motion detection circuitry. To determine the portion of the detected acceleration due to the user's environment, the electronic device can first determine the expected route of the user's environment, and then predict environment accelerations associated with the determined route. In some embodiments, the electronic device can receive the user's route from a user input. For example, the user can direct the electronic device to provide a route and directions for going from a starting position to a destination (e.g., using a mapping application of the device). As another example, the electronic device can extract a route from a history of routes entered by the user (e.g., the user has reached the destination but has not requested return directions; the device can assume that the user will be returning to the starting position).

In some embodiments, the electronic device can instead anticipate the user's route or portions of the user's route based one or more of the user's current position, the user's displacement history, mapping information, or any other suitable criteria. The device can determine device positioning information using any suitable component, including for example positioning circuitry (e.g., GPS data from past device movements). In some embodiments, the electronic device can monitor a user's movements over a period of time and determine that at a particular day and time (or several days and times), the user (and the device) follows a particular route. For example, the electronic device can determine that one or both of location and acceleration data follow a pattern during weekday commutes (e.g., acceleration and location data associated with a train ride). The electronic device can then predict that on all workdays (e.g., non-weekend and non-holidays, and non-vacation days as determined from a calendar or other application available on the device), the device will be subject to the acceleration associated with the commute. The electronic device can then remove predicted acceleration information, as determined by the historical data, from detected acceleration information to identify the particular acceleration information associated with the user's deterministic movements of the device.

In some embodiments, the electronic device can instead or in addition determine the user's current location, speed, and available roads or other infrastructure. From the user's current location and the available infrastructure, the electronic device can predict, with varying levels of certainty (for example, due to the width or number of lanes in a road), the expected route the user will follow in the near future. For example, if the user is located on a road that has no immediate intersections, the device can predict that the user is most likely to keep following the road. As another example, if the user is located on a road that has an entrance to a highway that substantially follows the road, the device can predict that the user is most likely to enter the highway to get to the user's destination faster. In some embodiments, the predictive model can be further refined using the user's history (e.g., locations where the user typically stops, such as home, office and usual store locations). Using the shape or curve of the expected road or other infrastructure, and the user's current speed, the electronic device can predict an expected acceleration that will be applied to the device. For example, the electronic device can determine from the curvature of a road and the user's speed the acceleration vectors tangential to the road and towards the origin of the circle associated with the road curvature to which the device will be subjected.

To improve the electronic device predictive model, additional information related to the user's environment can be provided to the device. For example, the electronic device can retrieve one or both of traffic and weather information that could affect the user's expected speed. As another example, the electronic device can retrieve information for scheduling changes or modifications of a public transportation system (e.g., train delays). As still another example, the electronic device can determine from a user's calendar information when a user's schedule will change the user's environment (e.g., determine which of two or more commuting modes the user will use).

In some cases, a user may wish to temporarily disable then re-enable the movement based scrolling mode. For example, the user may know that the user's environment will accelerate in an unpredictable manner. As another example, the user may wish to move the device as the user repositions himself (e.g., adjusts his seat) without changing the displayed information. Any suitable approach can be used to disable or temporarily disable the movement based scrolling mode. For example, the user can provide an input on an input mechanism (e.g., press and hold a button, or place a finger on a touch screen) to disable the mode. When the user releases the input (e.g., releases the button or removes his finger from the touch screen) or provides a second input (e.g., presses a second button or slides a finger across the touch screen), the device can re-enable the mode. The electronic device can redefine the movement origin each time the mode is re-enabled such that the user can return to the position of the device when the mode was re-enabled to display the information initially provided by the device when it was located at its original position.

In some embodiments, a user may move the device in a plane other than the plane of the display. If the motion sensing component is appropriately oriented, it may identify the non-display plane components of the acceleration (e.g., z-axis acceleration). The electronic device can then perform any suitable action using the out-of-plane acceleration information. In some embodiments, the electronic device may not perform any action. In some embodiments, the electronic device can perform an operation associated with the movement based scrolling mode (e.g., enable or disable the mode, or temporarily disable the mode). In some embodiments, the electronic device can change the zoom of the displayed information based on the detected acceleration component. For example, the electronic device can zoom in the information when the device determines that the display is moving towards the user, and zoom out the information when the display moves away from the user. One or both of the zoom amount (e.g., as an absolute value or as a percentage of the available zoom) and the zoom rate can be adjusted based on the varying value of the out of plane acceleration component (e.g., zoom more or faster as the device moves faster).

Figure 6:
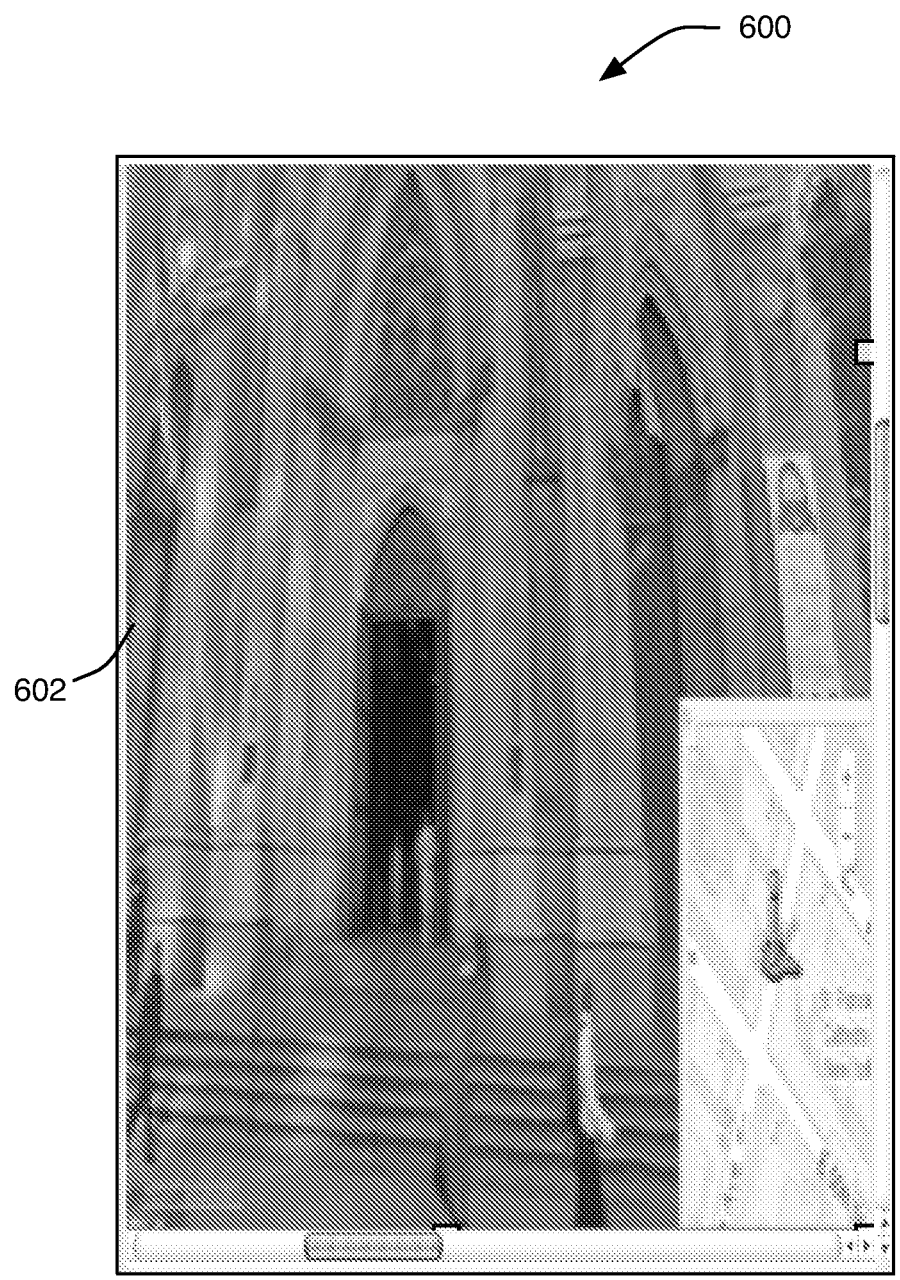
FIG. 6 is a schematic view of an illustrative display of information when an electronic device is tilted in accordance with one embodiment of the invention.

If the motion sensing component includes the capability of detecting or calculating the rotation of the device in the plane of the display, the electronic device can modify the display of the information to maintain the user's perspective of the displayed information despite the change in display orientation. For example, if the display tilts away from or towards the user, the electronic device can stretch portions of the displayed information to maintain the user's perception of the information. FIG. 6 is a schematic view of an illustrative display of information when an electronic device is tilted in accordance with one embodiment of the invention. Display 600 can include image 602 displayed to the user. To account for the tilt of the device, image 602 can be stretched such that when the user views display 600 from an angle (e.g., not straight on), the image appears to be unmodified. The amount by which image 602 is stretched or modified can be related to the detected tilt amount using any suitable approach. For example, the modification can be related to the amount of tilt, the speed of the tilt, or any other measurable characteristic of the tilt. In addition, the modification can occur using any linear or non-linear correlation, including for example using a hysteresis (e.g., as described above in connection with scrolling). The amount by which data is modified can be selected such that, from the user's perspective relative to the tilted display, the information displayed appears as if the user is viewing the information through a smaller window (e.g., the tilted display simply reduces the size of the window for viewing the information).

Figure 7:
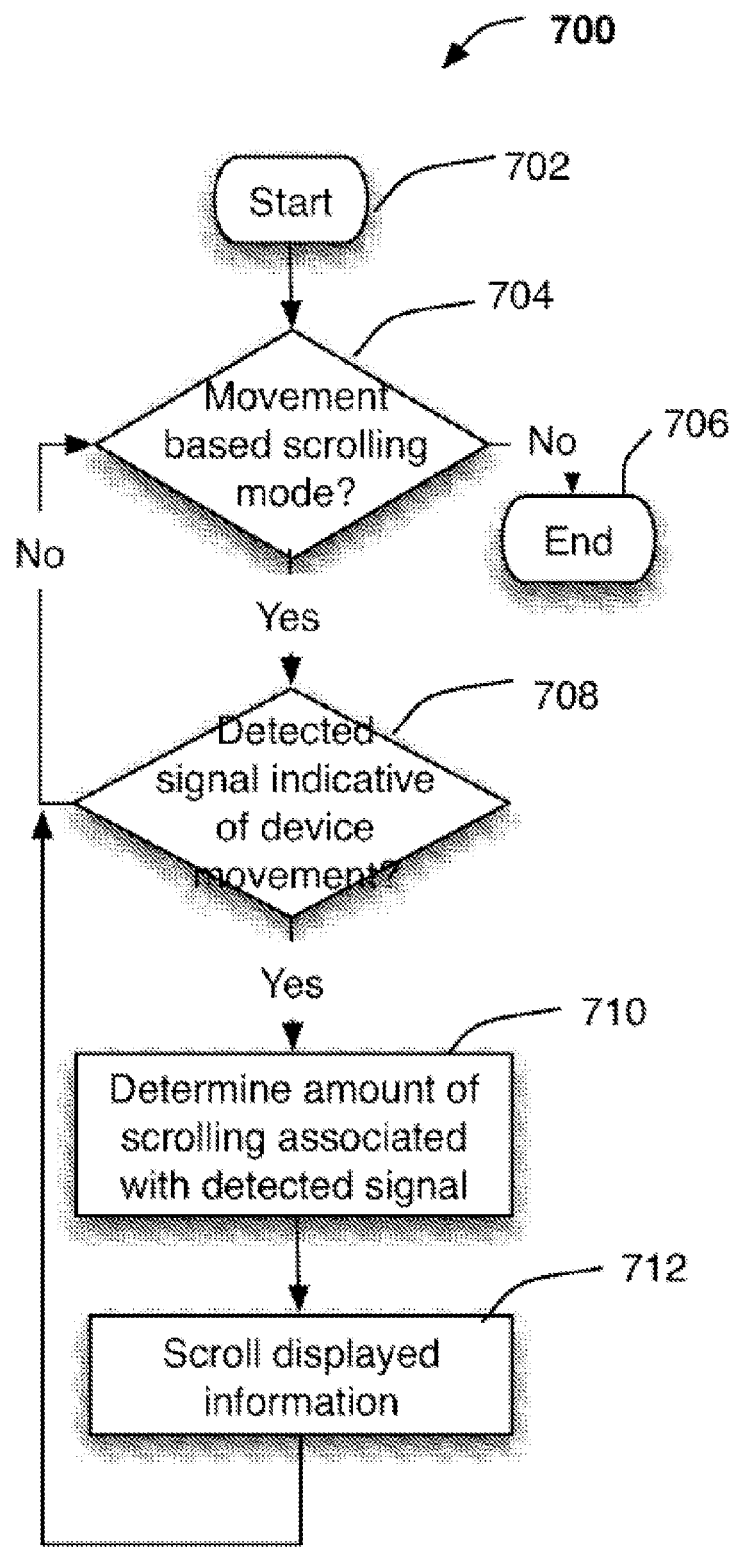
FIG. 7 is a flowchart of an illustrative process for scrolling displayed information based on deterministic movements of an electronic device in accordance with one embodiment of the invention.

The following flowcharts illustrate the steps of various processes used in different embodiments of the invention. FIG. 7 is a flowchart of an illustrative process for scrolling displayed information based on deterministic movements of an electronic device in accordance with one embodiment of the invention. Process 700 can begin at step 702. At step 704, the electronic device can determine whether a movement based scrolling mode is enabled. For example, the electronic device can determine whether the user has provided an input (e.g., using one or more of an input mechanism and movements of the device) for enabling the mode. As another example, the electronic device can determine whether the user has re-enabled a movement based scrolling mode after temporarily disabling the mode. If the electronic device determines that a movement based scrolling mode is not enabled, process 700 can move to step 706 and end.

If, at step 704, the electronic device instead determines that the movement based scrolling mode is enabled, process 700 can move to step 708. At step 708, the electronic device can determine whether a signal indicative of device movement is detected. For example, the electronic device can determine whether a motion sensing component is providing an output associated with a particular device movement (e.g., whether an accelerometer is providing an output). If the electronic device determines that no signal indicative of electronic device movement is detected, process 700 can return to step 704 and monitor for disabling of the movement based scrolling mode.

If, at step 708, the electronic device instead detects a signal indicative of electronic device movement, process 700 can move to step 710. At step 710, the electronic device can determine the amount of scrolling associated with the detected signal. For example, the electronic device can define a vector (e.g., a direction and an amount or length) associated with the movement. Using the vector, the electronic device can determine the particular manner in which displayed information is to scroll. For example, the electronic device can determine the direction in which to scroll information based on the determined vector direction. As another example, the electronic device can determine one or both of the amount and speed at which to scroll the information based on the determined vector length. In some embodiments, the amount and speed can include a hysteresis. At step 712, the electronic device can scroll the displayed information using the determined amount and direction. For example, the electronic device can scroll information based on the direction and amount determined at step 710. If the electronic device reaches an edge of the displayed information, the electronic device can stop scrolling the information (e.g., ignore subsequent device movements in the direction of the edge). Process 700 can then return to step 704 and monitor for disabling of the movement based scrolling mode.

Figure 8:
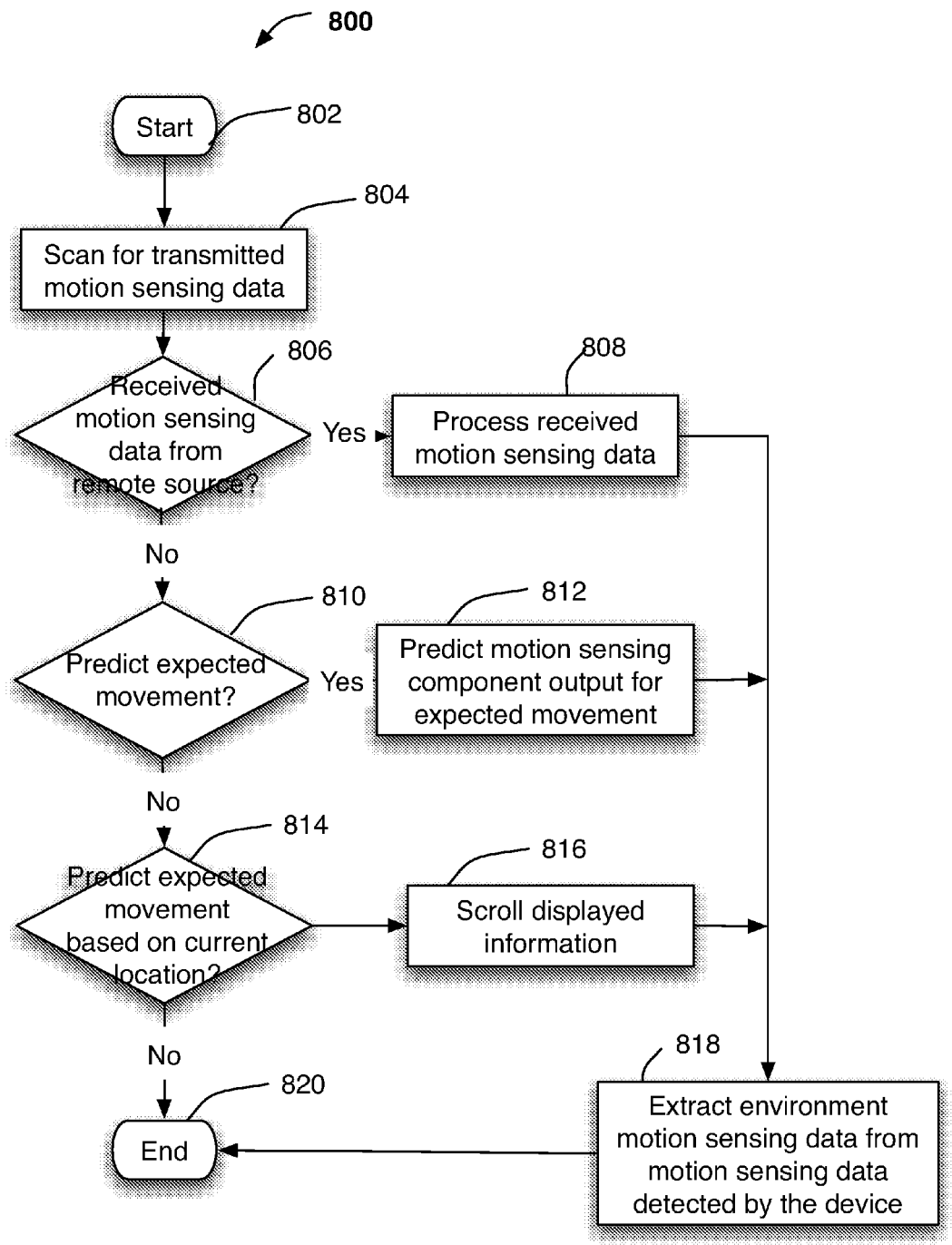
FIG. 8 is a flow chart of an illustrative process for determining motion information associated with an accelerating environment in accordance with one embodiment of the invention.

FIG. 8 is a flow chart of an illustrative process for determining motion information associated with an accelerating environment in accordance with one embodiment of the invention. Process 800 can begin at step 802. At step 804, the electronic device can scan for transmitted motion sensing data associated with an environment. For example, the electronic device can scan, along one or more communications protocols, for data from a motion sensing component (e.g., acceleration data from an accelerometer). At step 806, the electronic device can determine whether motion sensing data was received from a remote source. For example, the electronic device can determine whether communications circuitry detected or received motion sensing information. If the electronic device determines that motion sensing information was received, process 800 can move to step 808. At step 808, the electronic device can process the received motion sensing data to match or compare the data with motion sensing information detected by a motion sensing component of the device. For example, the electronic device can convert rotational acceleration information to linear acceleration information, process the received information to align the axes from which motion is detected of both the environment and the electronic device, or integrate or derive the received data to convert velocity data to or from acceleration data. Process 800 can then move to step 818, described in more detail below.

If, at step 806, the electronic device instead determines that no motion sensing data was received, process 800 can move to step 810. At step 810, the electronic device can determine whether the environment's expected movement can be predicted. For example, the electronic device can determine whether a user has provided an indication of a route that will be traveled by the user (e.g., the user requested directions for a route that the user is expected to follow). As another example, the electronic device can determine whether the user has identified a particular mode of transportation having a predetermined course (e.g., the user selected a particular train schedule, or purchased tickets for air or train travel at a particular time and on a particular vehicle). In some embodiments, the electronic device can instead or in addition determine the expected movement of the environment based on the user's history and past movements. For example, the electronic device can determine, from the user's past use, that the user follows a particular path having a substantially regular or expected motion sensing pattern at particular times of day (e.g., the motion sensing component output of a commute at a given time of day remains substantially similar during the commute). The electronic device can then determine that the user has started the expected movement based on the output of the motion sensing component (e.g., a unique initial output associated with the beginning of a commute) or on the location of the device (e.g., GPS circuitry of the device identifies the start of the user's commute).

If the electronic device determines that an indication of the user's expected movement was provided, process 800 can move to step 812. At step 812, the electronic device can predict motion sensing component outputs associated with the expected movement. For example, the electronic device can determine the expected speed and path of the user's environment during the expected movement, and compute acceleration information associated with the expected movement. In some embodiments, the electronic device can receive additional information, such as traffic and weather information to improve the acceleration predictions (e.g., predict variations in acceleration due to stop and go traffic if the traffic information indicates traffic jams). Process 800 can then move to step 818, described in more detail below.

If, at step 810, the electronic device instead determines that no indication of the user's expected movement was provided, process 800 can move to step 814. At step 814, the electronic device can determine whether the electronic device can predict the movement of the user's environment based on the current location of the device. For example, the electronic device can determine whether the user is on a vehicle that can only follow one direction over a particular distance (e.g., the user is on a road that has no turn-offs for a given distance, or the user is in a train that is limited by train tracks). If the electronic device determines that the movement of the user's environment can be predicted based on the current location of the user, process 800 can move to step 816. At step 816, the electronic device can predict motion sensing component outputs associated with the short-term expected movement. For example, the electronic device can determine the expected speed and path of the user's environment during the short-term expected movement, and compute acceleration information associated with the expected movement. In some embodiments, the electronic device can receive additional information, such as traffic and weather information to improve the acceleration predictions. Process 800 can then move to step 818, described in more detail below.

At step 818, the electronic device can extract, from the detected motion sensing information of the device (e.g., from the output of a motion sensing component of the device), the motion sensing data associated with the environment that was received or predicted. For example, the electronic device can process the environment data to correspond to the measurements of the device (e.g., process the data to generate acceleration information defined along the same origin and axes as the device, for example determined using location or GPS data) and subtract the processed data from the data measured by the device. Process 800 can then use the processed data, corresponding only to the device movement, to scroll information displayed by the device (e.g., perform process 700, FIG. 7 using the processed acceleration data). Process 800 can then end at step 820. If, at step 814, the electronic device instead determines that the movement of the user's environment cannot be predicted, process 800 can move to step 820 and end. Alternatively, process 800 can move to process 700 (FIG. 7) and provide movement based scrolling without accounting for an accelerating environment.

Figure 9:
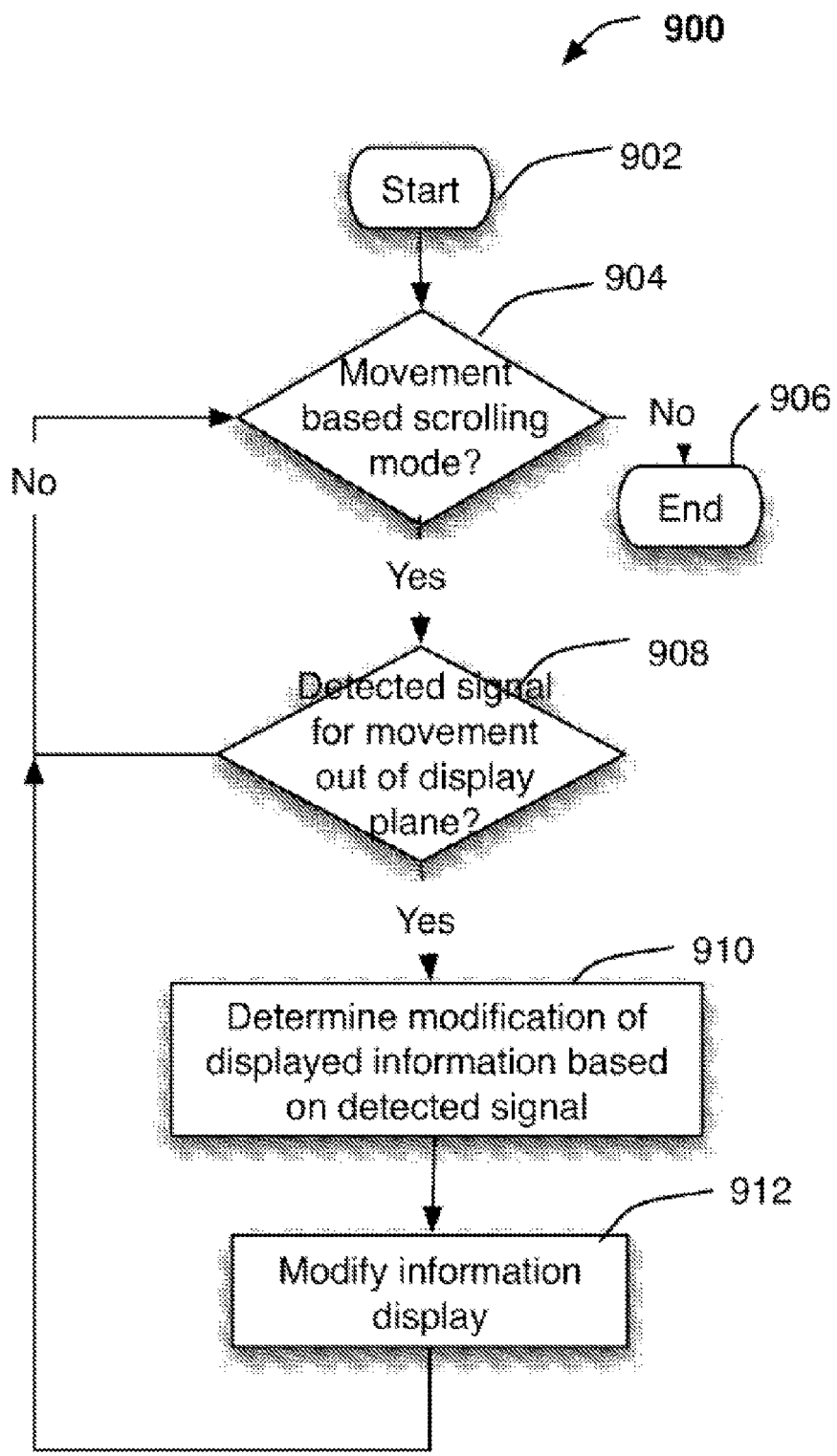
FIG. 9 is a flow chart of an illustrative process for modifying displayed information based on motion in a plane other than the plane of the display in accordance with one embodiment of the invention.

FIG. 9 is a flow chart of an illustrative process for modifying displayed information based on motion in a plane other than the plane of the display in accordance with one embodiment of the invention. Process 900 can begin at step 902. At step 904, the electronic device can determine whether a movement based scrolling mode is enabled. For example, the electronic device can determine whether the user has provided an input for enabling the mode. As another example, the electronic device can determine whether the user has re-enabled a movement based scrolling mode after temporarily disabling the mode. If the electronic device determines that a movement based scrolling mode is not enabled, process 900 can move to step 906 and end.

If, at step 904, the electronic device instead determines that the movement based scrolling mode is enabled, process 900 can move to step 908. At step 908, the electronic device can determine whether a signal indicative of device movement is detected. For example, the electronic device can determine whether a signal for movement of the device out of the display plane was detected. For example, the electronic device can determine whether a motion sensing component provided an output associated with movement in a plane other than that of the electronic device display (e.g., whether an accelerometer associated with an axis perpendicular to the display detected movement). If the electronic device determines that no signal was detected, process 900 can return to step 904 and monitor for disabling of the movement based scrolling mode.

If, at step 908, the electronic device instead detects a signal indicative of electronic device movement out of the display plane, process 900 can move to step 910. At step 910, the electronic device can determine the modification of the display based on the detected signal. For example, the electronic device can define a vector (e.g., a direction and an amount or length) associated with the out of plane movement. In some embodiments, the vector can be oriented perpendicular to the plane, such that the electronic device need only determine the length or amount associated with the vector. Using the vector, the electronic device can determine the particular manner in which to modify the displayed information. For example, the electronic device can determine the amount by which to stretch the displayed information to account for device tilt. As another example, the electronic device can determine the amount by which to zoom displayed information (e.g., zoom in when the device moves towards the user). In some embodiments, the electronic device can determine one or both of the amount and speed at which to modify the information display based on the determined vector length. In some embodiments, the amount and speed can include a hysteresis. At step 912, the electronic device can modify the displayed information based on the determined modification. If the electronic device reaches an edge or limit of the display modification, the electronic device can stop modifying the information (e.g., ignore subsequent device movements in the direction of the limit). Process 900 can then return to step 904 and monitor for disabling of the movement based scrolling mode.

The above described embodiments of the invention are presented for purposes of illustration and not of limitation, and the present invention is limited only by the claims which follow.

What is claimed is:

1. An electronic device comprising:
   an output component operative to communicate a plurality of objects to a user;
   a motion sensing component operative to detect movements of the electronic device; and
   a processor operative to:
      direct the output component to communicate a first portion of the plurality of objects, wherein, when the first portion is communicated, a second portion of the plurality of objects is not communicated;
      receive first data from the motion sensing component that is indicative of a first movement of the electronic device that is detected by the motion sensing component;
      decide that the detected first movement is at least partially caused by at least one movement of an environment of the electronic device that is distinct from any movement caused by the user by receiving movement information that corresponds to the at least one movement of the environment from a remote source;
      in response to the decision that the detected first movement is at least partially caused by the at least one movement of the environment, determine second data that corresponds to the at least one movement of the environment;
      process the received first data based on the determined second data to remove a portion of the detected first movement that is due to the at least one movement of the environment; and
      direct the output component to communicate at least a portion of the second portion of the plurality of objects based on the processed first data.

2. The electronic device of claim 1, wherein:
   the output component is a display; and
   the processor is further operative to:
      identify a representation on the display of a particular physical distance; and
      direct the display to scroll the displayed first portion to display the at least a portion of the second portion based on the identified representation.

3. The electronic device of claim 1, wherein:
   the output component is a display; and
   the processor is further operative to:
      detect a physical amount of the detected first movement;
      identify a representation on the display of a particular physical distance that corresponds to the detected physical amount; and
      direct the display to scroll the displayed first portion to display the at least a portion of the second portion based on the identified representation.

4. The electronic device of claim 1, wherein the processor is further operative to:
   enable a movement based output mode;
   direct the output component to communicate the first portion of the plurality of objects when enabling the movement based output mode;
   determine an initial position of the electronic device when enabling the movement based output mode;
   determine that a current position of the electronic device matches the initial position; and
   direct the output component to communicate the first portion of the plurality of objects in response to the determining that the current position matches the initial position.

5. The electronic device of claim 1, wherein the motion sensing component comprises at least one of an accelerometer and a gyroscope.

6. The electronic device of claim 1, wherein the processor is operative to process the received first data based on the determined second data by subtracting the determined second data from the received first data.

7. The electronic device of claim 1 further comprising communications circuitry for receiving environment data comprising the movement information that is associated with the environment from the remote source, wherein the processor is operative to decide that the detected first movement is at least partially caused by the at least one movement of the environment by determining that first environment data that corresponds to the at least one movement is received by the communications circuitry.

8. The electronic device of claim 7, wherein the processor is operative to determine the second data by processing at least a portion of the received first environment data.

9. The electronic device of claim 1, wherein the processor is further operative to decide that the detected first movement is at least partially caused by the at least one movement of the environment by determining that the second data is predictable.

10. The electronic device of claim 9, wherein the processor is operative to determine that the second data is predictable based on a current location of the electronic device.

11. A method for communicating information to a user using an electronic device comprising an output component, a motion sensing component, and a processor, the method comprising:
   communicating, using the output component, a first portion of the information to the user, wherein, when the first portion is communicated, a second portion of the information is not communicated;
   outputting, using the motion sensing component, first data that is indicative of a first movement of the electronic device that is detected by the motion sensing component;

deciding, using the processor, that the detected first movement is at least partially caused by at least one movement of an environment of the electronic device that is distinct from any movement caused by the user, wherein the deciding comprises receiving movement information that corresponds to the at least one movement of the environment from a source remote from the electronic device;

in response to the deciding that the detected first movement is at least partially caused by the at least one movement of the environment, determining, using the processor, second data that corresponds to the at least one movement of the environment;

processing, using the processor, the received first data based on the determined second data to remove a portion of the detected first movement that is due to the at least one movement of the environment; and communicating, using the output component, at least a portion of the second portion of the information to the user based on the processed first data.

12. The method of claim 11, wherein the processing comprises subtracting the determined second data from the received first data.

13. The method of claim 11, wherein:
the deciding comprises receiving with the electronic device the movement information that corresponds to the at least one movement of the environment from a sensor that is embedded in the environment; and
the determining the second data comprises processing, using the processor, the received movement information to correlate the received movement information with the detected first movement.

14. The method of claim 13, wherein the processing the received movement information comprises at least one of:
converting the received movement information to a different unit; and
adjusting a reference frame that is associated with the received movement information.

15. The method of claim 11, wherein:
the deciding further comprises determining that an indication from the user of a path that the electronic device follows is received by the electronic device; and
the determining the second data comprises predicting movement information that is associated with the path.

16. The method of claim 15, wherein the predicting comprises predicting an output of the motion sensing component based on at least one characteristic of the path.

17. The method of claim 11, wherein the deciding further comprises:
identifying a current location of the electronic device;
recognizing that only one path is available for the at least one movement of the environment over a particular distance; and
the determining the second data comprises predicting movement information that is associated with the recognized one path over the particular distance.

18. The method of claim 11, wherein the environment comprises a vehicle.

19. The method of claim 11, wherein the information comprises at least one of a document and an image.

20. Non-transitory computer readable media for communicating information to a user using an electronic device comprising an output component, a motion sensing component, and a processor, the non-transitory computer readable media comprising computer-readable instructions for:
communicating, with the output component, a first portion of the information to the user, wherein, when the first portion is communicated, a second portion of the information is not communicated;
outputting, with the motion sensing component, first data that is indicative of a first movement of the electronic device that is detected by the motion sensing component;
deciding, with the processor, that the detected first movement is at least partially caused by at least one movement of an environment of the electronic device that is distinct from any movement caused by the user, wherein the deciding comprises receiving movement information that corresponds to the at least one movement of the environment from a source remote from the electronic device;
in response to the deciding that the detected first movement is at least partially caused by the at least one movement of the environment, determining, with the processor, second data that corresponds to the at least one movement of the environment;
processing, with the processor, the received first data based on the determined second data to remove a portion of the detected first movement that is due to the at least one movement of the environment; and
communicating, with the output component, at least a portion of the second portion of the information to the user based on the processed first data.

* * * * *